Aug. 23, 1966  R. G. BALDWIN ETAL  3,267,744
CONTROL APPARATUS

Filed March 18, 1963  2 Sheets-Sheet 1

INVENTOR.
ROLLAND G. BALDWIN
GOFFE J. ERICKSON
LYNN H. ROOD
BY Roger W. Jensen
ATTORNEY Aug. 23, 1966  R. G. BALDWIN ETAL  3,267,744
CONTROL APPARATUS
Filed March 18, 1963  2 Sheets-Sheet 2

CURVE DATA
| SPACING | RADIUS |
|---|---|
| 0° | .250 |
| 10° | .276 |
| 20° | .306 |
| 30° | .338 |
| 40° | .374 |
| 50° | .414 |
| 60° | .458 |
| 70° | .513 |

CURVE DATA
| SPACING | RADIUS |
|---|---|
| 0° | .250 |
| 10° | .258 |
| 20° | .266 |
| 30° | .274 |
| 40° | .283 |
| 50° | .292 |
| 60° | .301 |
| 70° | .310 |
| 80° | .319 |
| 90° | .329 |
| 100° | .340 |
| 110° | .351 |
| 120° | .362 |
| 130° | .373 |
| 140° | .384 |
| 150° | .396 |
| 160° | .409 |
| 170° | .421 |
| 180° | .435 |
| 190° | .448 |
| 200° | .461 |
| 210° | .477 |
| 220° | .491 |
| 230° | .507 |

INVENTOR.
ROLLAND G. BALDWIN
GOFFE J. ERICKSON
LYNN H. ROOD
BY Roger W. Jensen
ATTORNEY United States Patent Office 3,267,744
Patented August 23, 1966

3,267,744
CONTROL APPARATUS
Rolland G. Baldwin, St. Paul, Goffe J. Erickson, St. Anthony Village, and Lynn H. Rood, New Brighton, Minn., assignors to Honeywell Inc., a corporation of Delaware
Filed Mar. 18, 1963, Ser. No. 265,877
6 Claims. (Cl. 74—5)

The invention described herein was made in the performance of work under a NASA contract and is subject to the provisions of Section 305 of the National Aeronautics and Space Act of 1958, Public Law 85–568 (72 Stat. 435; 42 U.S.C. 2457).

This invention pertains to sensitive instruments and more particularly to a fluid suspension means for sensitive instruments.

The applicants' invention comprises a closed cycle fluid suspension means for a rotatable element of a sensitive instrument. The applicants' invention has specific application to a single degree of freedom gyroscope and will be described in conjunction therewith. The applicants' invention is by no means limited to this particular application, but has application to all sensitive instruments. The applicants obtain closed cycle fluid suspension of a rotatable element by providing a pump means integral with the sensitive instrument which is operable to produce fluid flow at a relatively high pressure. The applicants' unique closed cycle fluid support or suspension means may utilize either a liquid or a gas as the fluid.

It is therefore an object of this invention to provide an improved control apparatus.

This and other objects of the invention will become apparent from a study of the accompanying specification and claims in conjunction with the drawings in which:

Figure 1:
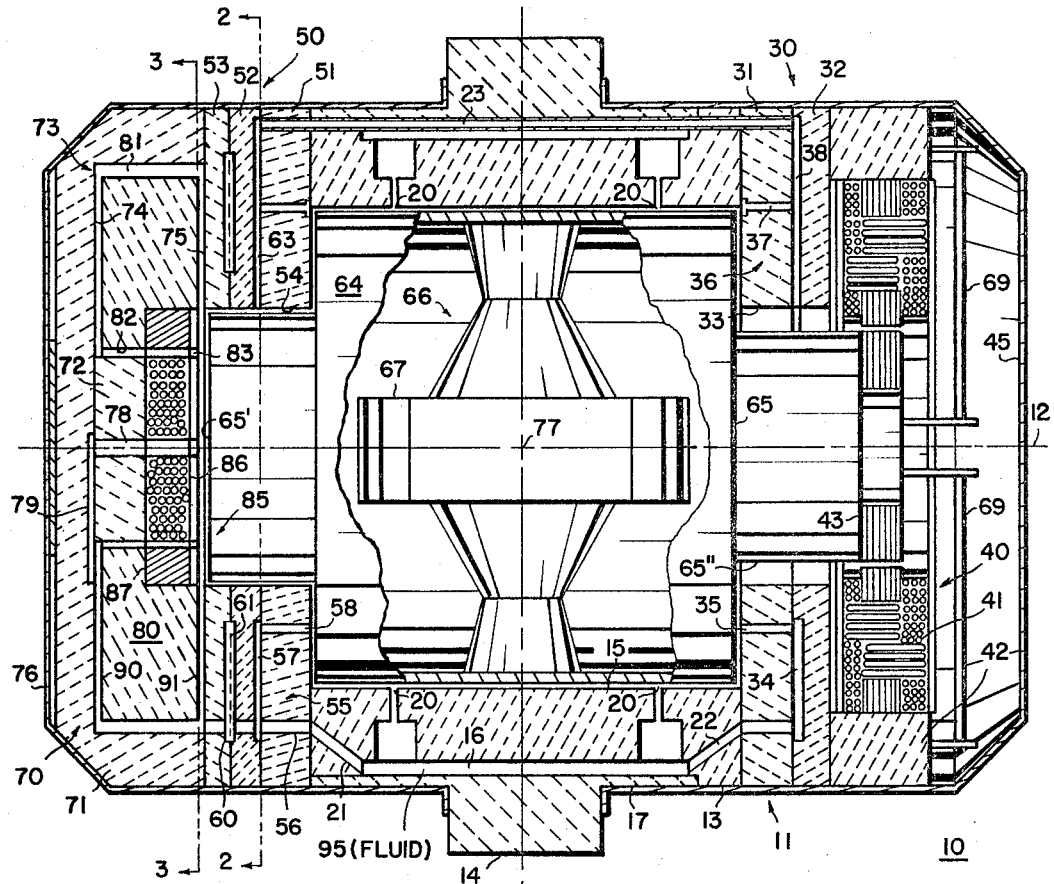
FIGURE 1 is a schematic cross sectional view (enlarged scale) of a gyroscope utilizing the applicants' unique closed cycle fluid suspension system taken along section lines 1—1 of FIGURE 2.

Referring now to FIGURE 1, reference numeral 10 generally depicts a schematic representation of a single degree of freedom gyroscope. A hollow, cylindrical ceramic housing means 11 is provided having an axis of symmetry 12. Housing means 11 includes a cylindrical member 13 having a cylindrical opening 15 therethrough. Housing means 11 also includes a ring shaped, ceramic member 17 which circumscribes member 13 so as to define an annular chamber 16 therebetween which has an axial extent substantially equal to the axial extent of member 13. Member 17 has an enlarged radius section or flange 14 thereon. A plurality of hydrostatic journal or radial bearing means 20 are provided interconnecting annular chamber 16 and cylindrical opening 15. A total of eighteen hydrostatic bearing means 20 are angularly spaced about and symmetrical with axis 12. Nine hydrostatic bearing means 20 are located within each of two planes which are spaced apart and perpendicular to axis 12. The applicants do not wish to be limited to the particular configuration of hydrostatic bearing means illustrated in FIGURE 1. Various other modifications may be utilized. A plurality of high pressure fluid distribution passages 21, 22 are provided within cylindrical member 13 in communication with annular chamber 16. A total of eighteen passages 21 and a total of eighteen passages 22 are angularly spaced about and symmetrical with axis 12. The function of passages 21 and 22 will be more fully described hereinafter. A plurality of low pressure fluid distribution passages 23 are provided within member 13 and extend parallel to axis 12 over the entire axial extent of member 13. A total of nine passages 23 are angularly spaced about and symmetrical with axis 12. The function of passages 23 will be more fully described hereinafter.

A ceramic end member 30 is provided at one end of cylindrical opening 15. End member 30 comprises two disc shaped ceramic members 31 and 32 positioned adjacent to one another. The axis of symmetry of members 31 and 32 coincides with axis 12. Members 31 and 32 each have a central, circular cross section opening therethrough which forms a cylindrical opening 33 in end member 30. Members 31 and 32 cooperate to define a plurality of high pressure fluid distribution passages 34. A total of eighteen passages 34 are angularly spaced about and symmetrical with axis 12. One end of each passage 34 is in communication with each passage 22 of member 13. The other end of each passage 34 is in communication with opening 15 and forms a hydrostatic thrust or axial bearing means 35. Thus passages 22 and 34 connect annular chamber 16 to bearing means 35. The function of bearing means 35 will be more fully described hereinafter. Members 31 and 32 also cooperate to define a plurality of low pressure fluid distribution passages 36; each passage 36 comprises a subpassage 37 and a subpassage 38. A total of nine passages 36 are angularly spaced about and symmetrical with axis 12. One end of subpassage 37 is in comunication with opening 15 and the other end of subpassage 37 is in communication with passage 38 at a point intermediate its ends. One end of subpassage 38 is in communication with opening 33 in end member 30 and the other end of subpassage 38 is in communication with passage 23 of member 13. Thus passage 36 connects opening 15 and opening 33 to low pressure distribution passage 23. End member 30 may be fabricated as a single element, however machining of the required fluid distribution passage is greatly simplified by utilizing two components.

A ceramic end member 50 is positioned adjacent member 13 at the other end of cylindrical opening 15. End member 50 comprises disc shaped ceramic member 51, a ceramic distribution member 52 and a disc shaped ceramic member 53. Members 51, 52, and 53 each have a central, circular cross section opening therethrough which forms a cylindrical opening 54 in end member 50.

Figure 2:
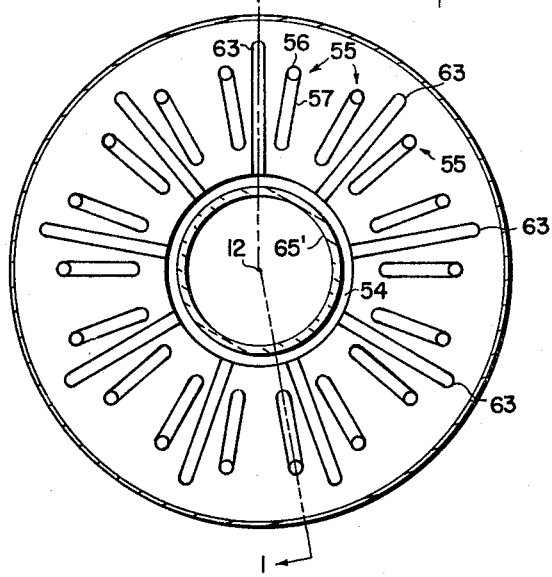
FIGURE 2 is a reduced scale cross sectional view taken along section lines 2—2 of FIGURE 1.

Member 51 is positioned adjacent to member 52 so as to define a plurality of low pressure distribution passages 63. As illustrated in FIGURE 2, a total of nine passages 63 are angularly spaced about and symmetrical with axis 12. One end of passages 63 is in communication with opening 54 and the other end of passages 63 is in communication with passage 23 of member 13. Thus, passage 63 connects low pressure distribution line 23 to opening 54 in end member 50.

Members 51 and 52 also cooperate as to define a plurality of high pressure distribution passages 55 therebetween; each passage 55 comprises a subpassage 56 and a subpassage 57. As is more clearly illustrated in FIGURE 2, a total of eighteen passages 55 are angularly spaced about and symmetrical with axis 12. One end of subpassage 56 is in communication with passage 21 of member 13. One end of subpassage 57 is in communication with opening 15 and forms a hydrostatic thrust or axial bearing means 58. The function of bearing means 58 will be more fully described hereinafter.

Member 53 is positioned adjacent to member 52 so as to form an annular filter chamber 60 therebetween. A filter means 61 is positioned within chamber 60 so as to filter the fluid which flows therethrough. The other end of subpassage 56 is in communication with filter chamber 60. Thus passage 55 connects filter chamber 60 to hydrostatic thrust bearing means 58 and to annular chamber 16.

The surfaces of members 51, 52 and 53 are machined optically flat so that it is not necessary to provide any further sealing means therebetween. However, conventional type sealing means may be utilized if desired. An advantage in not utilizing a conventional type sealing means such as O rings is the elimination of contaminating particles.

Thus housing means 11 including member 13, end member 30, and end member 50 defines a substantially enclosed cylindrical cavity 64. A generally cylindrical closed, hollow gimbal element 65 having a reduced diameter section 65' at one end and a similar reduced diameter section 65'' at the other end is provided. The axis of symmetry of gimbal element 65 coincides with axis 12. Gimbal element 65 is supported for rotation about axis 12 by hydrostatic journal bearing means 20. Axis 12 is defined as the output axis of gyro 10. Gimbal element 65 is supported axially by hydrostatic thrust bearings means 35 and 58. The radial clearance between gimbal element 65 and hydrostatic journal bearings means 20 in member 13 is 300 to 500 microinches. The axial clearance between gimbal element 65 and hydrostatic thrust bearing means 35 is also 300 to 500 microinches.

A spin motor means 66 is positioned within gimbal element 65. Spin motor means 66 may be a gas bearing spin motor such as disclosed in copending application Serial No. 34,947, S. L. Burgwin et al. now Patent 3,101,424, which is assigned to the same assignee as the present application. Spin motor means 66 may also be one of the conventional ball bearing spin motors which are well known to those skilled in the art. Spin motor means 66 includes a rotor element 67 which is mounted for rotation about a spin axis 68. Spin motor means 66 is energized from a suitable power supply (not shown) of 115 volts, 400 c.p.s. The current is supplied to spin motor means 66 within rotatable gimbal element 65 by a plurality of flex leads 69. Spin axis 68 lies in the plane of the drawing (FIGURE 1) and is perpendicular to output axis 12. The input axis 77 of gyroscope 10 is perpendicular to the plane of the drawing (FIGURE 1) and is perpendicular to both output axis 12 and spin axis 69.

A conventional type combined pickoff and torquer assembly 40 is positioned adjacent end member 30. Combined pickoff and torquer means 50 includes stator windings 41 wound up on a holder means 42 which is attached to member 32. Means 40 also includes a rotor element 43 mounted upon gimbal element 65. The detailed structure of a combined pickoff and torquer assembly is well known to those skilled in the art and need not be further described here. A typical combined pickoff and torquer assembly is illustrated in patent 2,669,126, J. D. Simmons et al. Of course there are numerous well known combined pickoff and torquer configurations which may be utilized. A Mu metal, cup-shaped cover member 45 is provided which encloses end member 30, pickoff and torquer assembly 40, a portion of cylindrical member 13 and attaches to flange 14. Cover member 45 functions to provide a hermetic seal for gyro 10 and to shield the gyro from external magnetic fields.

A pump means 70 including a pump chamber and a rotor element is provided adjacent to end member 50. A ceramic, cup-shaped end cap 71 is provided adjacent to and in contact with member 53. A cylindrical member 72 having a central bore 78 therethrough is positioned within and rigidly attached to end cap 71 at the center thereof. End cap 71, member 72, and member 53 cooperate to define an annular pump chamber 73 therebetween. One end of annular chamber 73 is formed by a plane surface 74 on end cap 71. The other end of chamber 73 is formed by a parallel plane surface 75 on member 53. The inner periphery of annular chamber 73 is formed by the periphery of cylindrical member 72. The outer periphery of chamber 73 is formed by end cap 71. Bore 78 is connected to chamber 73 by a passage 79 located in end cap 73. A cup-shaped, Mu metal, cover element 76 encloses end cap 71, members 51, 52 and 53, and a portion of member 13 and is sealed against flange 14. Cover element 76 functions to hermetically seal gyro 10 and to shield gyro 10 from external magnetic fields.

An annular rotor element 80 is positioned within chamber 73. The outer periphery of rotor 80 is spaced apart from end cap 71 so as to define an annular gap 81 therebetween. Rotor element 80 has a central opening 82 therethrough which is slightly larger in diameter than cylindrical member 72 so as to form a hydrodynamic bearing means 83 therebetween. A hydrodynamic bearing is defined as the fluid pressure support of a member relative to its support in which the fluid pressure is generated by the relative movement of the member and the support. This is vastly different from a hydrostatic bearing which is defined as the fluid pressure support of a member relative to its support in which the fluid pressure is generated by an external means and is pumped between the member and its support. As pointed out earlier, bearing means 20, 35 and 58 are hydrostatic type bearing means.

A motor means 85 is provided to rotate rotor element 80 relative to the means defining chamber 73. Motor means 85 comprises stator windings 86 wound upon member 72 and a hysteresis ring 87 mounted upon rotor element 80. Motor means 85 is a typical synchronous motor and functions to rotate rotor element 80 at a substantially constant velocity relative to the means defining chamber 72. Motor means 85 is energized from the same power supply (not shown) as spin motor means 66 which provided 115 volts at 400 c.p.s.

Figure 4:
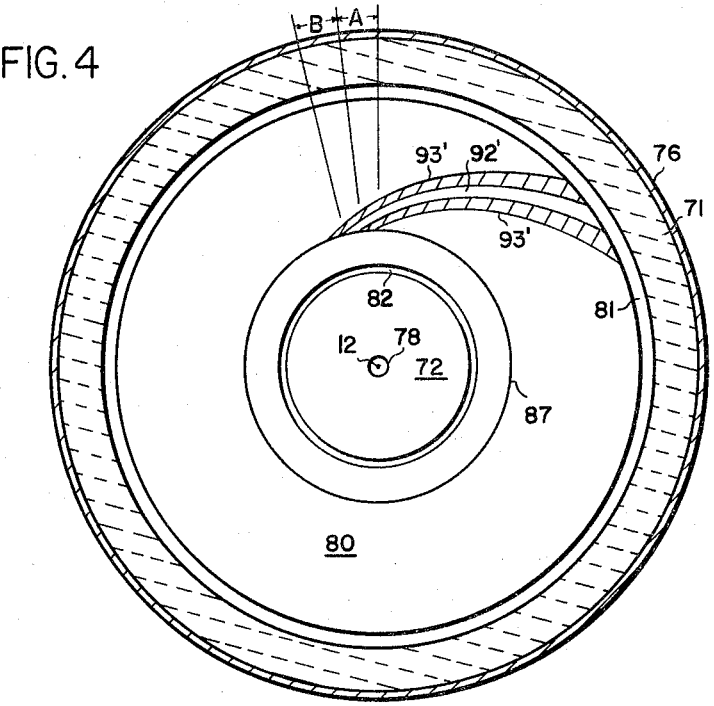
FIGURE 4 is an alternate embodiment of a pump means.
Figure 3:
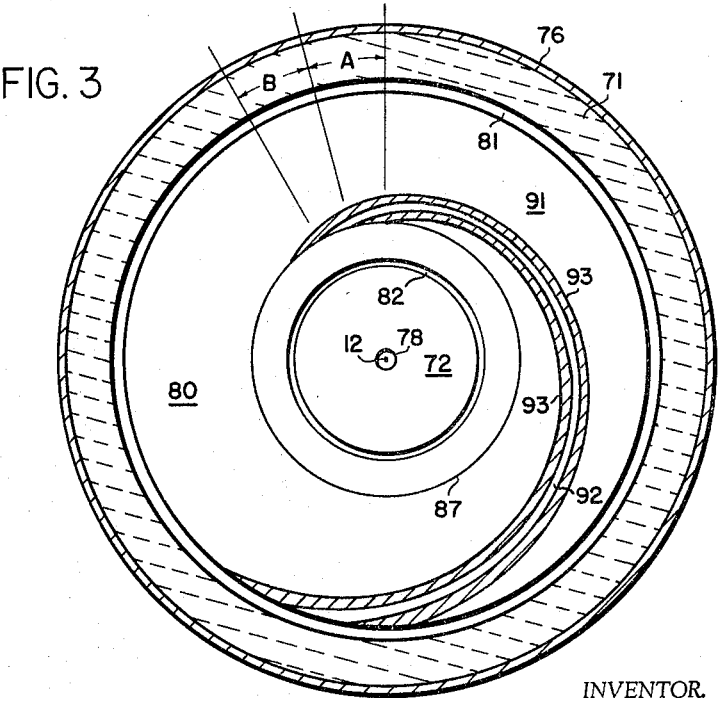
FIGURE 3 is a cross sectional view taken along section lines 3—3 of FIGURE 1.

Annular shaped rotor element 80 has a plane surface 90 at one end thereof and a plane surface 91 at the other end thereof. Plane surface 90 of rotor element 80 is parallel to and spaced apart from plane surface 74 of end cap 71. The distance between surface 90 and surface 74 in the embodiment illustrated in FIGURE 1 is approximately 300 microinches although this may be varied in other embodiments. Surface 91 of rotor element 80 is parallel to and spaced apart from surface 75 of element 53. The distance between surfaces 91 and 75 is also 300 microinches. Surfaces 90 and 91 have a plurality of spiral grooves therein as illustrated in FIGURES 3 and 4. The spiral grooves on surface 91 are identified by reference numeral 92. Intermediate each spiral groove is a land portion 93. Although only one spiral groove 92 is illustrated in FIGURE 3, it will be understood that a total of eight identical spiral grooves are positioned upon surface 91 at equal angular intervals about axis 12. It is highly critical to the applicants' invention that close tolerances be maintained in the fabrication of the pump means 70. For example, in one specific embodiment, the depth of grooves 92 is .0003 inch and the maximum variation between groove depths is .00005 inch. The angular distance of grooves 92 at the inner radius of rotor 80 is illustrated in FIGURE 3 by angle A. In the specific embodiment lustrated angle B is equal to 22°30′. Of course various tance between grooves 92 at the inner radius of rotor 80 is illustrated by angle B. In the specific embodiment illustrated angle B is equal to 22°30′. Of course various other values can be utilized for angles A and B depending on the pumping characteristics desired. The embodiment illustrated in FIGURE 3 is referred to as an 80 degree spiral pattern. This indicates that the angle between the groove 92 and a radial line to the center of rotor 80 is 80 degrees. Relevant spiral data is obtained from the curve data table included in FIGURE 3. It is possible to place the grooves 92 upon the fixed surfaces 74 and 75 rather than upon rotor surfaces 50 and 51. Typical dimensions of one embodiment of pump means 70 are as follows:

(a) Rotor 80 has a two inch diameter (b) A groove to land ratio of 4 (angle A is four times as large as angle B)
(c) Running clearance between surfaces 74 and 90 and between surfaces 75 and 91 equals 300 microinches
(d) The depth of grooves 92 equals 900 microinches
(e) Rotor 80 rotated at 24,000 r.p.m.
(f) A 70° spiral groove pattern A pump means 70 utilizing the characteristic dimensions above is capable of generating a gas flow of 500 cubic centimeters per minute for each hydrostatic bearing 20, 35, and 58 at a pressure of 10 p.s.i. Pump means 70 can be optimized to provide maximum pressure output or maximum flow output by varying the groove to land ratio and the ratio of groove depth to running clearance.

It can be shown that pump means 70 generates a pressure P and a flow Q as given by following formulas:

$$P = \frac{.127 \mu R^2 \omega}{\lambda_2^2}$$

$$Q = .63 R^2 \lambda_2 \omega$$

where
$\mu$—viscosity
R—radius of hydrostatic bearing means 20, 35, 58.
$\omega$—angular velocity
$\lambda_2$—running clearance The pressure is given in pounds per square inch and the flow rate is given in cubic inches per second on the above formulas.

FIGURE 4 is a view of a surface 91 having an alternate groove pattern thereon. The groove in FIGURE 4 is identified as reference numeral 92' and the lands are identified by numeral 93'. FIGURE 4 illustrates a 60° spiral pattern. The relevant spiral data is again tabulated in the table included with FIGURE 4. Angle A is equal to 10 degrees in this particular embodiment as is angle B. Of course it is again possible to vary angles A and B depending on the type of pumping performance desired.

In operation, a fluid 95 is provided within housing means 11. Spin motor means 66 is energized from a suitable power supply so as to rotate rotor 67 at a synchronous speed about spin axis 68. Pump motor means 85 is energized from the same power supply and drives rotor 80 at a substantially constant angular velocity about axis 12. Rotor 80 is rotated clockwise as viewed in FIGURE 3. The rotation of rotor 80 relative to member 72 generates a relatively high fluid pressure within gyro 82 so as to develop a hydrodynamic bearing means 83 which supports rotor 80 for rotation about axis 12. There is negligible fluid flow from gyro 82. The rotation of rotor 80 and grooves 92 contiguous plane surfaces 74 and 75 generates, by viscous shear, a relatively high pressure at the outer periphery thereof and in gap 81. A radial pressure gradient is developed between surfaces 74 and 90 and between surfaces 75 and 91. Thus pump means 70 functions to provide both a hydrodynamic thrust bearing for rotor 80 and a source of relatively high pressure fluid for hydrostatic bearing means 20, 35 and 58.

The fluid 95 which is maintained at a relatively high pressure in gap 81 when rotor 80 is rotated by motor means 85 is directed from gap 81 into filter chamber 60. Fluid 95 flows from filter chamber 60 into subpassages 56 of high pressure distribution passages 55. A portion of fluid 95 within subpassage 56 flows into subpassage 57 and to hydrostatic thrust bearing means 58. The remainder of fluid 75 within subpassages 56 flows through passages 21 and into annular chamber 16. A portion of fluid 95 in chamber 16 flows into the plurality of hydrostatic journal bearing means 20. The remainder of fluid 95 in annular chamber 16 flows through high pressure distribution passages 22 and 34 and into hydrostatic thrust bearing means 35. Gimbal element 65 is thereby suspended or supported by fluid 95 for rotation about output axis 12. Bearing means 20 provide the radial or journal suspension of gimbal element 65 and bearing means 35 and 58 provide the axial or thrust suspension of gimbal element 65. With gimbal element 65 fluid suspended, gyro 10 is operable to function as a typical closed loop, single degree of freedom gyro, which operation is well known to those skilled in the art and need not be described in detail.

The fluid 95 exhausting from bearing means 20, 35 and 58 is returned to pump means 70 through relatively low pressure distribution passages so as to provide a closed cycle gimbal suspension. Fluid 95 exhausting from bearing means 35 flows generally radially inwardly to opening 33 in end member 30. Fluid 95, which is at a relatively low pressure after exhausting from bearing means 35, flows into subpassage 38 of low pressure distribution passage 36. A portion of fluid 95 exhausting from bearing means 20 flows axially along gimbal element 65 and into subpassages 37 of low pressure distribution passages 36. Fluid 95 in subpassages 37 flows into subpassages 38. Fluid 95 in subpassages 38 flows into passages 23 and then into passages 63. The remaining portion of fluid 95 exhausting from bearing means 20 also flows into passages 63. The fluid within passages 63 flows into opening 54 in end member 50. The fluid exhausting from bearing means 55 also flows into opening 54. A portion of the relatively low pressure fluid 95 in opening 54 is directed into the clearance between surfaces 75 and 91 in chamber 73. The remaining portion of the relatively low pressure fluid in opening 54 is directed through bore 78 and passage 79 to the clearance between surfaces 74 and 90 in chamber 73. Pump means 70 pump the relatively low pressure fluid 95 to a relatively high pressure and recirculate it.

While we have shown and described a specific embodiment of this invention, further modifications and improvements will occur to those skilled in the art. We desire it to be understood, therefore, that this invention is not limited to the particular form shown and we intend in the appended claims to cover all modifications which do not depart from the spirit and scope of this invention.

What is claimed is:

1. In a single degree of freedom gyroscope: closed hollow housing means; fluid means within said housing means; a closed hollow gimbal element positioned within said housing means; spin motor means mounted within said gimbal element for rotation about a first axis; hydrostatic bearing means located on said housing means for suspending said gimbal element for rotation relative to said housing means about a second axis perpendicular to said first axis; viscous shear pump means including a rotor member rotatably mounted within said housing means for rotation about said second axis, a first and a second plane surface located on said rotor member perpendicular to said second axis, a plurality of spiral grooves in said first and said second plane surface, said spiral grooves being symmetrical with respect to said second axis; a third plane surface located on said housing means spaced apart from and parallel to said first plane surface; a fourth plane surface located on said housing means spaced apart from and parallel to said second plane surface; motor means for rotating said rotor member at a substantially constant velocity relative to said housing means; said pump means functioning upon relative rotation between said first and second surface on said rotor and said third and fourth surface on said housing means to generate a relatively high pressure fluid; and distribution means operatively connecting said pump means to said hydrostatic bearing means for directing the relatively high pressure fluid to said hydrostatic bearing means, said relatively high pressure fluid becoming relatively low pressure fluid after passage through said hydrostatic bearing means, the relatively low pressure fluid returning to said viscous shear pump means through said distribution means thereby providing closed cycle fluid suspension of said gimbal element.

2. In a gyroscope: closed hollow housing means; fluid means within said housing means; a closed hollow gimbal element positioned within said housing means; spin motor means mounted within said gimbal element for rotation about a first axis; hydrostatic bearing means located on said housing means for suspending said gimbal element for rotation about a second axis perpendicular to said first axis; viscous shear pump means including a rotor member rotatably mounted within a chamber in said housing means for rotation about said second axis; a first plane surface located on said housing at one end of said chamber and a second plane surface located on said housing at the other end of said chamber, said first and second plane surfaces being perpendicular to said second axis; a plurality of spiral grooves in said first and second plane surface symmetrical with respect to said second axis, said rotor member being positioned intermediate said first and second plane surfaces; motor means for rotating said rotor member at a substantially constant velocity relative to said housing means, said viscous shear pump means functioning upon relative rotation between said rotor and said first surface and said second surface on said housing means to generate a relatively high pressure fluid; and distribution means operatively connecting said pump means to said hydrostatic bearing means for directing a relatively high pressure fluid to said hydrostatic bearing means, said relatively high pressure fluid becoming relatively low pressure fluid after passage through said hydrostatic bearing means, the relatively low pressure fluid returning to said viscous shear pump means through said distribution means thereby providing closed cycle fluid suspension of said gimbal element.

3. In an inertial instrument: closed hollow housing means; fluid means within said housing means; a closed hollow gimbal element positioned within said housing means; spin motor means rotatably mounted within said gimbal element for rotation about a first axis; hydrostatic bearing means located on said housing means for suspending said gimbal element for rotation about a second axis perpendicular to said first axis; viscous shear pump means including a rotor member rotatably mounted within said housing means for rotation about said second axis; a first plane surface located on said rotor member perpendicular to said second axis; a plurality of spiral grooves in said first surface symmetrical with respect to said second axis; a second plane surface located on said housing means spaced apart from and parallel to said first plane surface; means for rotating said first surface on said rotor member relative to said second surface on said housing means, said viscous shear pump means functioning upon relative rotation between said rotor and said housing means to provide a relatively high pressure fluid; and distribution means operatively connecting said pump means to said hydrostatic bearing means for directing the relatively high pressure fluid to said hydrostatic bearing means, said relatively high pressure fluid becoming relatively low pressure fluid after passage through said hydrostatic bearing means, the relatively low pressure fluid returning to said viscous shear pump means through said distribution means thereby providing closed cycle fluid suspension of said gimbal element.

4. In an inertial instrument: closed hollow housing means; fluid means within said housing means; a closed hollow gimbal element positioned within said housing means; spin motor means rotatably mounted within said gimbal element for rotation about a first axis; hydrostatic bearing means located on said housing means for suspending said gimbal element for rotation about a second axis perpendicular to said first axis; viscous shear pump means including a rotor member rotatably mounted within a chamber in said housing means; a first plane surface located on said housing at one end of said chamber; a plurality of spiral grooves in said first plane surface; a second plane surface located on said rotor member contiguous to and parallel to said first plane surface; means for rotating said rotor member relative to said housing means; said viscous shear pump means functioning upon relative rotation between said first plane surface on said housing means and said second plane surface on said rotor to generate a relatively high pressure fluid; and distribution means operatively connecting said pump means to said hydrostatic bearing means for directing the relatively high pressure fluid to said hydrostatic bearing means, said relatively high pressure fluid becoming relatively low pressure fluid after passage through said hydrostatic bearing means, the relatively low pressure fluid returning to said viscous shear pump means through said distribution means thereby providing closed cycle fluid suspension of said gimbal element.

5. In an inertial instrument: closed hollow housing means; fluid means within said housing means; a gimbal element positioned within said housing means; hydrostatic bearing means located on said housing means for suspending said gimbal element for rotation about an axis; viscous shear pump means including a rotor member rotatably mounted within said housing means for rotation about said axis; a first plane surface located on said rotor member perpendicular to said axis; a plurality of spiral grooves in said first plane surface symmetrical with respect to said axis; a second plane surface located on said housing means spaced apart from and parallel to said first plane surface; means for rotating said first plane surface on said rotor member relative to said second plane surface on said housing means, said viscous shear pump means functioning upon relative rotation between said rotor and said housing means to provide a relatively high pressure fluid; and distribution means operatively connecting said pump means to said hydrostatic bearing means for directing the relatively high pressure fluid to said hydrostatic bearing means, said relatively high pressure fluid becoming relatively low pressure fluid after passage through said hydrostatic bearing means, the relatively low pressure fluid returning to said viscous shear pump means through said distribution means thereby providing closed cycle fluid suspension of said gimbal element.

6. In a sensitive instrument: closed hollow housing means; fluid means within said housing means; an element positioned within said housing means; hydrostatic bearing means located on said housing means for suspending said element for rotation about an axis; viscous shear pump means including a rotor member rotatably mounted within said housing means; a first plane surface located on said rotor member; a plurality of spiral grooves in said first plane surface; a second plane surface located on said housing means spaced apart from and parallel to said first plane surface; means for rotating said rotor member relative to said housing means, said pump means functioning upon relative rotation between said first surface on said rotor and said second surface on said housing means to provide a relatively high pressure fluid; and distribution means operatively connecting said pump means to said hydrostatic bearing means for directing the relatively high pressure fluid to said hydrostatic bearing means, said relatively high pressure becoming relatively low pressure after passage through said hydrostatic bearing means, the relatively low pressure fluid returning to said viscous shear pump means through said distribution means thereby providing closed cycle fluid suspension of said element.

References Cited by the Examiner

UNITED STATES PATENTS 2,913,907 11/1959 Sedgfield _____ 74—5
3,093,004 6/1963 Summers _____ 74—5.43

FRED C. MATTERN, Jr., *Primary Examiner.*

M. KAUFMAN, BROUGHTON G. DURHAM,
*Examiners.*

P. W. SULLIVAN, *Assistant Examiner.*